United States Patent [19]

Schmidt

[11] 4,109,460
[45] Aug. 29, 1978

[54] LIQUID FUEL ROCKET ENGINE HAVING ADJUSTABLE NOZZLE THROAT SECTION

[75] Inventor: Günther Schmidt, Unterhaching, Fed. Rep. of Germany

[73] Assignee: Messerschmitt-Bolkow-Blohm GmbH, Fed. Rep. of Germany

[21] Appl. No.: 674,089

[22] Filed: Apr. 6, 1976

[30] Foreign Application Priority Data

Apr. 11, 1975 [DE] Fed. Rep. of Germany ....... 2515845

[51] Int. Cl.² ..................... F02K 9/02; F02K 11/02; F02K 1/10
[52] U.S. Cl. ............................. 60/204; 60/230; 60/267; 60/271; 239/127.1; 239/265.43
[58] Field of Search ................ 60/267, 232, 230, 271, 60/204; 239/265.19, 127.1, 127.3, 265.43

[56] References Cited

U.S. PATENT DOCUMENTS

| | | | |
|---|---|---|---|
| 2,570,629 | 10/1951 | Anxionnaz | 60/271 |
| 2,637,973 | 5/1953 | Lawrence | 60/271 |
| 3,286,469 | 11/1966 | Atherton | 60/271 |
| 3,377,803 | 4/1968 | Prachar | 60/267 |
| 3,871,173 | 3/1975 | McKenna | 60/267 |

OTHER PUBLICATIONS

Sutton, G. P., "Rocket Propulsion Elements", 3rd Edition, Wiley & Sons, NY, 1963; pp. 200-201.

Primary Examiner—Robert E. Garrett
Attorney, Agent, or Firm—McGlew and Tuttle

[57] ABSTRACT

A liquid fuel rocket engine comprises a housing having an outer annular wall and an inner annular wall which define therebetween a combustion chamber of substantially uniform cross section and leading to a converging wall section and a nozzle throat of narrow dimension. Means are provided to vary the nozzle throat section during operation of the engine in order to obtain better performance operation of the engine. The means for varying the dimension comprises a thermal arrangement whereby the cooling of the housing walls are divided up into sectors through which a propellant component is circulated. The temperature of the circulated component and the quantity of component which is circulated are advantageously controlled in order to vary the thermal expansion of the various sector portions and thereby change the axial and radial position of the walls defining the nozzle throat section. This is done either by controlling the propellant component which is directed through each of four separate sectors of the housing parts making up the outer and inner walls of the housing or by controlling only the cooling rate of the outer walls to vary the boundaries of the nozzle throat. The control is accomplished by a globe valve member which is pivoted in order to vary the distribution flow of a propellant component through each of a plurality of flow paths for regulating the cooling of the various portions of the inner and outer housing walls. In addition a mechanical means may be provided to actually vary the position of one or both of the outer and inner walls so as to control the nozzle throat section.

15 Claims, 5 Drawing Figures

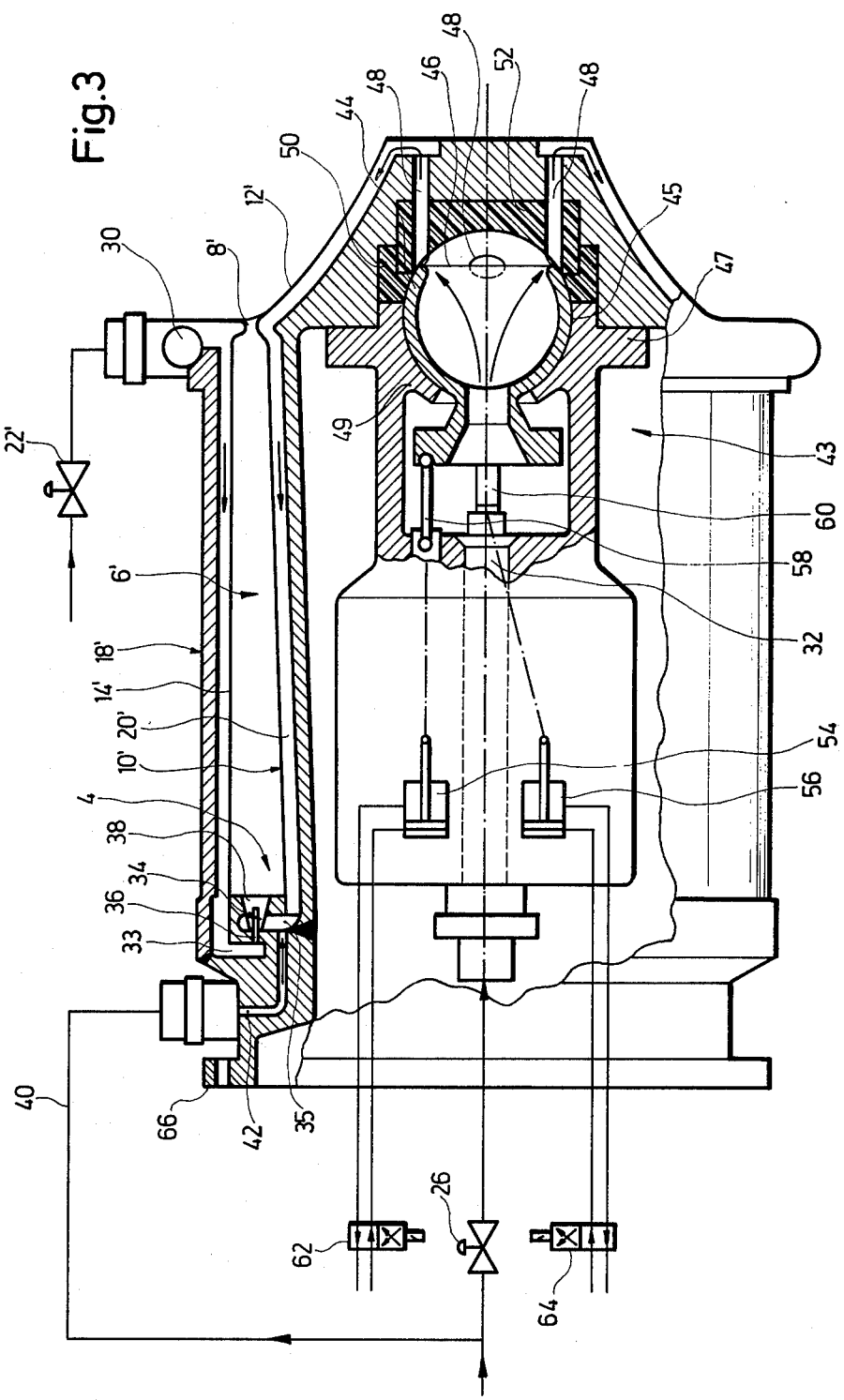

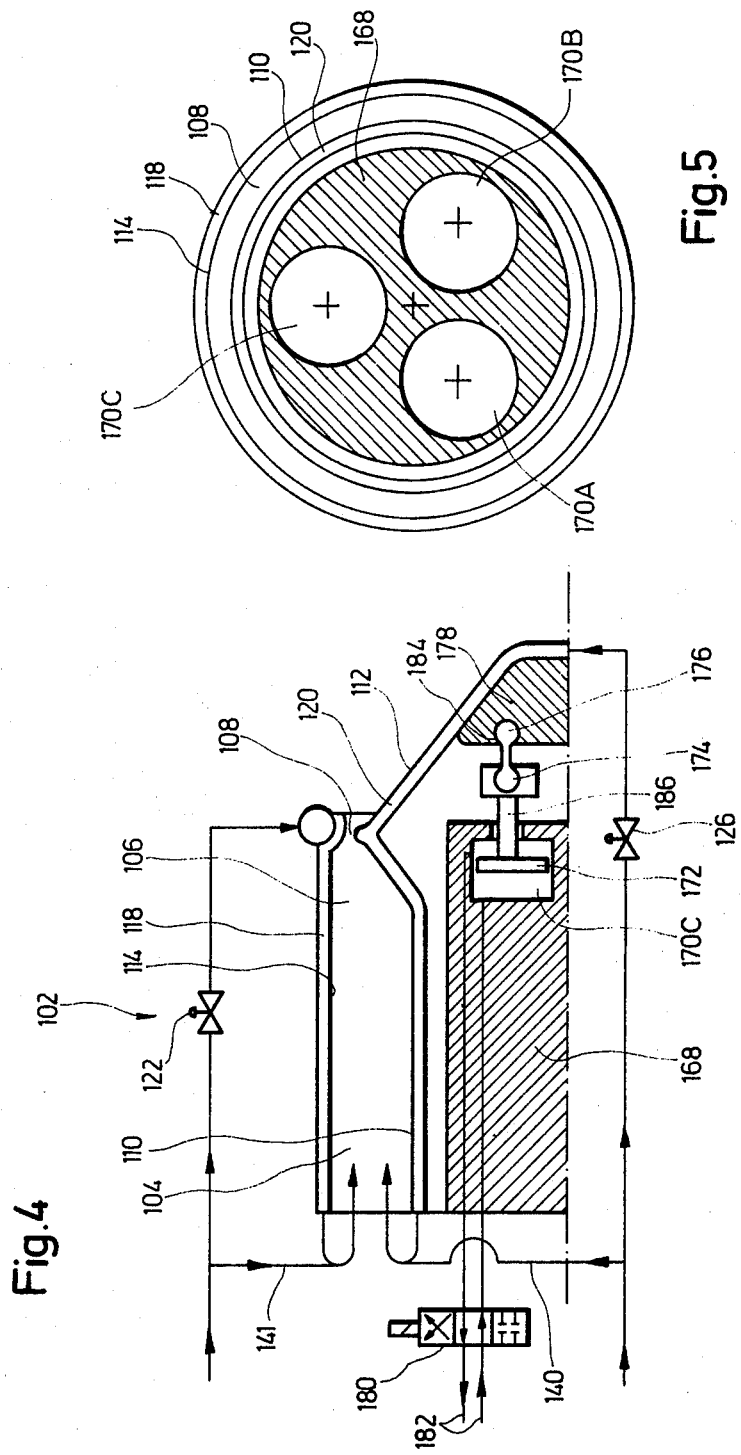

LIQUID FUEL ROCKET ENGINE HAVING ADJUSTABLE NOZZLE THROAT SECTION

BACKGROUND OF THE INVENTION

1. Field of the Invention

This invention relates in general to the construction of liquid fuel rocket engines and in particular to a new and useful apparatus and method for operating said engines to control the dimension of the nozzle throat section in accordance with the engine operation.

2. Description of the Prior Art

In the control of the thrust output of rocket engines it is known to keep the combustion chamber pressure constant by varying the cross-section of the throat in order to obtain better performance values than in normal combustion chamber pressure regulations where the specific impulse drops considerably at partial load, particularly in the vicinity of the ground and hence in the first stages of operation of missiles. Thus it is known to construct a ring throat nozzle with a narrow ring slot behind the nozzle throat at the inner boundary wall and the outer boundary wall is open outwardly so that the jet exit surface adapts itself automatically to the respective expansion ratio and the inner nozzle part is displaced axially during the control of the longitudinal thrust. It is also known to provide a bell shaped nozzle with a mushroom type insert body mounted for longitudinal and pivotal movement in the throat for controlling the longitudinal and transverse thrust. The axial and radial adjustment of such a device depends on the size and direction of the desired thrust vector as disclosed in U.S. Pat. No. 3,192,714. Both types of control of the throat cross-section require a complicated mechanism with a constructionally elaborate support and sealing for a moving part that is under high thermal stress and pressure.

SUMMARY OF THE INVENTION

In accordance with the invention there is provided a rocket engine which is of simple design and thus less susceptible to trouble in operation and which permits the control of the thrust vector both in size and in direction in order to obtain a maximum performance value. With the inventive engine the inner and outer housing parts which together define an annular nozzle are adjustable relative to each other especially in the range of the throat by controlling the reversible deformation of at least one of the nozzle housing parts in an axial or a radial direction or both. The longitudinal thrust control as well as the transverse thrust control is achieved simultaneously by adaptation of the surface bounding the jet exit to a respective optimum value. This control is effected by reversible thrust nozzle deformation by adjusting movements which are naturally very small but sufficient to effect a significant change of the nozzle cross-section at the throat area. This is because the nozzle throat section has a very small gap width and the adjustments which are necessary to maintain a substantially constant combustion chamber pressure over the entire operating control range are very small and do not require a displaceable support and the sealing of a highly stressed nozzle part.

In a particularly advantageous embodiment of the invention the control system has a thermal control device for regulating the thermal expansion of at least one sector of a part of the housing defining at least one side of the nozzle part so that the nozzle adjustment can be effected by strict temperature control without any mechanical controls. In such an embodiment the cooling of the engine by a propellant component which is employed in most engines of this type in any event is utilized for the thermal dimensional adjustment of the nozzle housing parts or sectors and each cooling system or sector of the housing part can be controlled separately for regulating the individual thermal expansion or contraction of these parts. By varying the amount of coolant supplied to each nozzle part, the axial relative adjustment of the nozzle parts is regulated in the range of the throat and thus the size of the throat cross-section. An unsymmetrical distribution of the cooling current over the circumference of the nozzle parts leads to an unsymmetrical temperature distribution to effect a deflection of one part relative to the other so as to vary the ring throat cross section symmetrically or unsymmetrically as desired so as to effect a transverse thrust control.

The invention is adaptable to a system in which the inner and outer housing parts are made up into separate cooling sectors which may be separately controlled in respect to temperature by varying the quantity of coolant which is directed therethrough so as to achieve an unsymmetrical temperature distribution in a simple manner by merely controlling the amount of propellant component which is circulated through the individual sectors. Such a system requires very little engineering effort with engines using several fuel components and where the nozzle parts of the engine are traversed by the different fuel components. With the inventive arrangement the various sectors making up the inner and outer housing parts which bound the combustion chamber and the throat section it is a simple matter to control the temperature of the components which are circulated through these parts so as to regulate the thermal expansion or contraction of the parts. In the preferred arrangement the parts are all held against displacement at their inner ends or the interior end of the combustion chamber. The outer ends are then free to move to expand or contract as desired.

The invention contemplates however the deformation of the walls defining the thrust nozzle by either thermal deformation or by mechanical elastic deformation of one or more nozzle parts. Mechanical deformation may be carried out easily by a hydraulic control mechanism which although it requires a greater mechanical input compared to a thermal control insures the undelayed regulation of the throat control section. Preferably both types of control that is a combination of thermal and elastic control or mechanical control are provided simultaneously. This provides a device which is constructionally simpler and more rugged but a less sensitive temperature control may be used for coarser adjustment and the finer adjustment may be carried out by a quick responding mechanical control.

Accordingly it is an object of the invention to provide a method of operating a rocket engine having a housing with spaced apart outer and inner walls which define a combustion chamber having a convergant section and a nozzle throat therebetween which comprises varying the position between the outer and inner walls to vary the cross-section of the nozzle throat in accordance with changes in engine output.

A further object of the invention is to provide a rocket engine which comprises a housing having spaced apart annular inner and outer housing parts which define therebetween a combustion chamber with converging walls leading to a nozzle throat portion and which includes control means for moving at least a portion of one of the housing parts relative to the other for varying the size of the nozzle throat during engine operation.

A further object of the invention is to provide a liquid rocket engine which is simple in design, rugged in construction and economical to manufacture.

For an understanding of the principles of the invention, reference is made to the following description of typical embodiments thereof as illustrated in the accompanying drawings.

BRIEF DESCRIPTION OF THE DRAWINGS

In the Drawings:

FIG. 3 is a partial elevational view and partial sectional view of another embodiment of thrust engine constructed in accordance with the invention;

FIG. 4 is a view similar to FIG. 1 of another embodiment of thrust engine constructed in accordance with the invention; and FIG. 5 is a partial sectional and end elevational view of the engine shown in FIG. 4.

GENERAL DESCRIPTION OF THE PREFERRED EMBODIMENTS

Figure 2:
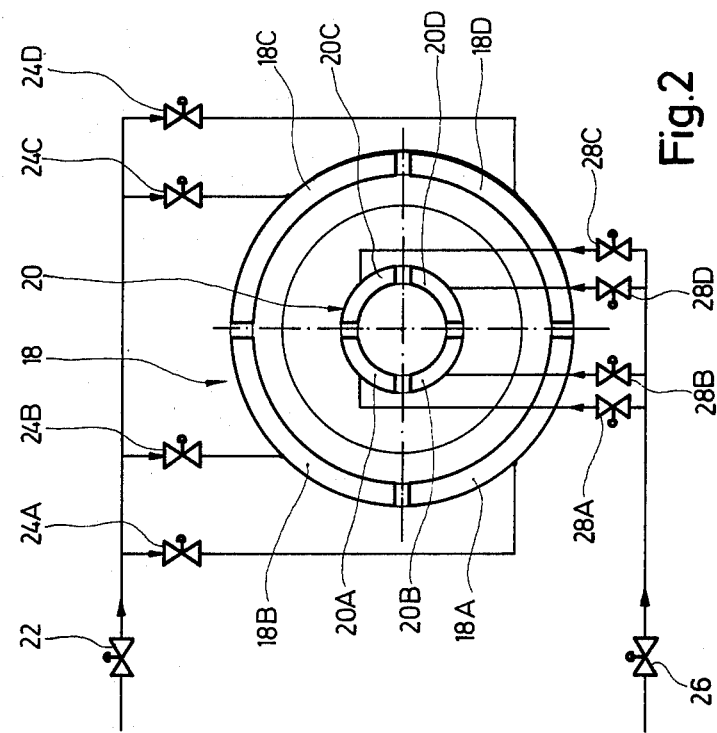
FIG. 2 is an end elevational view of the engine shown in FIG. 1.
Figure 1:
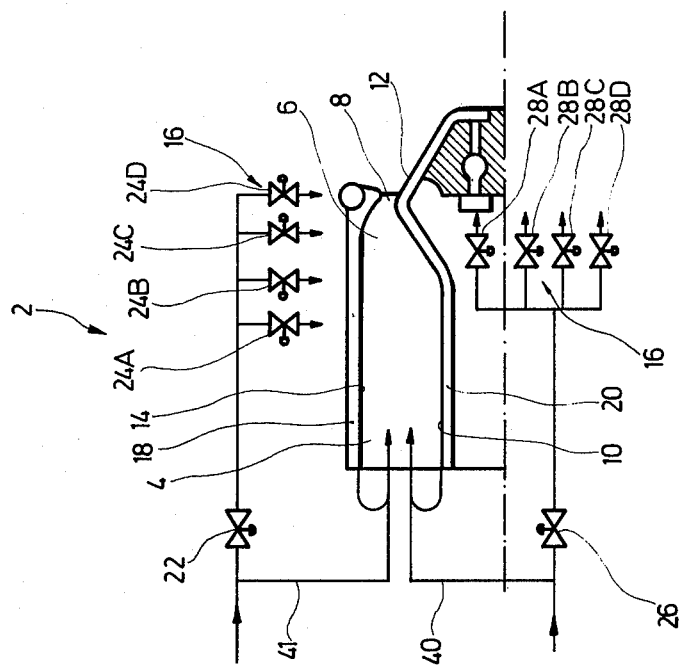
FIG. 1 is a schematic partial axial sectional view of an engine having means for varying the dimensions of the nozzle throat constructed in accordance with the invention.

Referring to the drawings in particular the invention embodied in FIGS. 1 and 2 comprises an engine generally designated 2 in the form of a binary liquid fuel rocket engine which includes an inner annular housing portion 10 and an annular housing portion 14 which define a combustion chamber 4 therebetween with a ring throat nozzle 6. The throat nozzle 6 has a throat section 8 designed as a narrow ring slot and the inner housing parts 10 defines a conically tapered diffuser part 12. The outer nozzle part 14 terminates directly behind the throat 8. The diverging flow downstream of the nozzle throat 8 is therefore bounded on only one side that is by the diffuser part 12 while the outer jet contour is free radially outwardly and adapts itself automatically to the respective expansion ratio.

In accordance with the invention the inner housing part 10 and the outer housing part 14 are moved relative to each other by controlling the cooling in a regenerative cooling system which not only serves as a protection against overheating of the parts but has an additional thermal control device 16 so as to control the thermal expansion or contraction of the inner and outer housing parts and to thus vary the throat cross-section in accordance with engine operation. In order to permit a free thermal deformation of the nozzle parts of the housing parts 10 and 14 in the range of the throat 8 they are clamped on one end namely at the combustion chamber end.

The outer nozzle housing part 14 is surrounded by cooling jacket 18 which is traversed by a partial current of the first propellant component which is injected into the combustion chamber 4 for example UDMH. The size of this partial current is regulated by means of a coolant control valve 22 and the residual current or stream of this first propellant component which is not required for controlling the temperature of the outer nozzle housing part 14 flows through a by-pass 41 directly into the combustion chamber 4. The inner housing part 10 contains an inner cooling jacket 20 which is traversed by a partial flow of the second propellant component which is subsequently injected into the combustion chamber 4 for example IRFJA. The size of this flow or current is regulated by means of a coolant control valve 26 arranged in a flow stream of the second fuel propellant component. The partial amount of the second propellant component which is not required for cooling is injected through a by-pass 40 directly into the combustion chamber 4.

The partial amounts of the fuel components which cool the nozzle parts of the housings 10 and 14 are so selected that they are sufficiently protected against overheating during all stages of operation. Above this minimum value of the circulation of the propellant components there is a flow of the propellant components through the housing parts which is controlled by the valves 22 and 26 independently of each other so as to adjust the position of the housing parts 10 and 14 relative to each other in the range of the throat section by controlling their thermal expansion or contraction of various portions or segments thereof. This achieves a regulation of the cross-section of the throat 8 in such a way that the pressure in the combustion chamber can be maintained constant independently of the size of the throat section. In this manner the throat section is reduced with a dropping of engine output and increased with an increase in the engine output in order to provide an optimum operation. In order to obtain a maximum control range of the throat cross-section the housing parts 10 and 14 are controlled in respective opposite directions, that is the lowest value is attained at the maximum cooling of the first housing part 10 and a minimum cooling of the second housing part 14. For smaller control ranges of the throat cross-section a thermal control for a single housing part is sufficient.

In accordance with the invention the housing parts 10 and 14 can be controlled in the range of the throat 8 relative to each other by a thermal control device 16 not only for movement in an axial direction but also for movement in radial directions relative to each other. As shown in FIG. 2 the outer cooling jacket 18 is preferably subdivided in a circumferential direction into four separate segments 18A, 18B, 18C and 18D. The coolant flow is regulated through each of these segments by the control valve 22 and by separate adjustable distributor valves 24A, 24B, 24C and 24D.

Similarly the inner cooling jacket 20 is divided into four separate segments 20A, 20B, 20C and 20D which are each connected through a distributor valve 28A, 28B, 28C and 28D to a control valve 26 for the second propellant component. By regulating the distributor valves, a different division of the cooling current over the respective cooling jacket segments is achieved for each housing part 10 or 14 and thus an irregular temperature distribution in a circumferential direction is attainable to effect a deflection of the associated housing part of the nozzle throat section in a radial direction due to the different longitudinal thermal expansion of the respective segment and thus the throat cross-section will be made to vary symmetrically or unsymmetrically if desired so that the direction of the thrust vector may be changed as desired. In order to obtain a large control range, the housing parts 10 and 14 are also thermally controlled in opposite directions regarding their radial deflection and the radial thermal control including the subdivision of the jacket into individual segments and the distributor valves can be eliminated in one of the nozzle parts if a smaller relative radial movement of the housing parts 10 and 14 are sufficient to control the direction of the thrust.

In the embodiment shown in FIG. 3 parts corresponding to those shown in FIGS. 1 and 2 are designated with the same number but with a prime. In this embodiment the thrust control is effected with a thermal control of the ring throat cross-section as in the previous embodiment. The construction includes housing parts 10 and 14 which are clamped at the combustioning chamber end and supported on a fastening flange 66 which is provided for mounting the engine on a support body which is not shown. The outer cooling channel 18' which is formed in the outer wall 14' comprises a single cooling jacket and a partial flow of the first propellant component is directed into this jacket by a control valve 22'. The flow is uniformly distributed over the cooling jacket 18 in a circumferential direction by a feed ring 30 and after it passes through the jacket 18 it is directed into the combustion chamber 4' through a central injection nozzle 36 of the injection head 34. A partial amount of the first propellant component which is not used for cooling is directly admitted into the combustion chamber 4' by flow through a by-pass line 40 into a by-pass conduit 42. By the thermal control of the outer housing part 14' it is thus possible to regulate its axial extension and thus shorten the size of the throat cross-section and the radial control of the cross-section is effected exclusively by the inner housing part 10 by means of a specially designed distributor valve 43 which permits an infinite division of the coolant flow stream in a circumferential direction of the inner cooling jacket 20.

In accordance with a further feature of the invention a distributor valve 43 is provided in the embodiment of FIG. 3 which comprises a hollow globe valve 44 which is mounted sealingly and with limited pivotal movement in all directions in a valve chamber 45 which is partly formed by attaching pieces 50 and 52 and a valve housing 49. Means are connected to a ring flange 47 of the globe valve 44 for pivoting the valve in a desired tilting direction to vary the flow through one of a plurality of passages 48 which connect out of the valve chamber and supply cooling for individual segmental portions of the cooling flow channels defined in the inner wall 10'. The adjusting means comprises adjusting motors 54 and 56 which are hydraulically operated through a control valve 62 and 64 respectively whose adjusting pistons are coupled through adjusting levers 58 and 60 with the ring flange 47. The adjusting levers have universal joints at each end and they are capable of pivoting the globe valve 44 to either partially or fully uncover or cover the openings to the passages 48. The levers 58 and 60 are connected to the globe valve 44 at points 44 which are spaced apart by 90° relative to each other in a circumferential direction.

In the embodiment of FIG. 3 the inner cooling jacket 20 is subdivided in a circumferential direction into a plurality of cooling jacket segments which are separately connected into the valve chamber 45 through respective distributor pipes 48 of which only three are shown in FIG. 3. In the non-tilted position of the valve 44 shown in FIG. 3 all of the passages 48 are open slightly into the valve chamber 45 so that they are supplied with a continuous partial flow of cooling liquid which comprises a propellant component. When the globe valve 44 is tilted a distributor pipe 48 arranged in the tilting direction will be completely closed by a control edge 46 of the valve while a diametrically opposed distributor pipe 48 and the other distributor pipes 48 inbetween are progressively opened wider. It is thus possible to achieve an unsymmetrical delicately stepped distribution of the coolant current over the inner nozzle cooling jacket 10' depending on the number of cooling jacket segments by means of the distributor valve 43 and in accordance with the amount and direction of tilting movement of valve 44.

The amount of the partial flow of the second propellant component which is branched off for cooling is set by control valve 26' as in the other embodiment. This partial stream flows over a feed duct 32 and a center bore in the ring flange 47 to the globe valve 44 and after passing through the distributor pipes 48 and the cooling jacket segment passes into a ring conduit 35 and into injection ring nozzle 38 of the injection head 34 for spraying into the combustion chamber 4'. If necessary an additional partial amount of the second propellant component which is not required for cooling is directed through a by-pass line 40 and a by-pass conduit 42 and is combined with the other portion in the injector ring nozzle 38 for spraying into the combustion chamber 4'.

In the embodiment of the invention shown in FIGS. 4 and 5 corresponding parts are provided with the same reference numerals but increased by one hundred. In this embodiment the inner nozzle housing part 110 is elastically deformed in order to effect a change in the nozzle throat section. For this purpose the inner housing part 110 is clamped at the end adjacent the combustion chamber 4' and it is designed so that it can be bent elastically both in an axial and radial direction within certain limits in order to control the nozzle cross section in the range of ring throat.

For the application of axial and radial forces on the inner nozzle part 110 of the housing it is provided with a control device in the form of three hydraulic motors 170A, 170B and 170C which are evenly distributed in a circumferential direction on a rigid stationary housing part as shown in FIG. 5. These motors include pistons 172 which are connected tension and compression resistant to a piston rod 186 with the interposition of an operating plunger 184 which is hinged at each end 174 and 176 to a pressure body 178 which is arranged in front of a diffuser part 112 of the inner housing part 110 at three points evenly distributed in circumferential directions. The hydraulic motors 170 are double action motors and are controlled by electrically operated reversing valves 180 arranged in a pressure medium line 182. With the hydraulic motors 170 the pressure body 178 can be sent forth and backwardly in an axial direction for regulating the size of the ring flow cross-section. Therefore by actuation of the respective hydraulic motors 170 it can be tilted in any direction up to a given angle so as to accomplish a radial deflection of the inner nozzle part of the housing 110 to vary the size or asymmetry of the ring throat cross-section depending upon the size and direction of its movement.

The elastic deformation can be combined with a thermal deformation according to the embodiments of FIGS. 1 to 3 but in each case slight axial or radial relative movements of the nozzle parts in the range of the ring throat suffice to effect the necessary cross-sectional variations of the nozzle throat, since the ring slot is very narrow and measures only a few millimeters in respect to development of thrust up to several thousand kilopounds. In a typical embodiment of the invention for a thrust of 1200 kilopounds, the ring slot width is about 1 mm with a ring throat diameter of about 100 mm.

While specific embodiments of the invention have been shown and described in detail to illustrate the application of the principles of the invention, it will be understood that the invention may be embodied otherwise without departing from such principles.

What is claimed is:

1. A liquid fuel rocket engine comprising an outer and inner concentrically arranged annular wall each having a plurality of separate segmental cooling jackets extending only over a portion of the circumference of said walls, a head closing one end of said walls, said walls defining a combustion chamber adjacent said head with a throat nozzle adjacent the opposite end opening outwardly for the discharge of thrust gases, the inner one of said walls having a diverging portion extending outwardly of said throat nozzle, means for circulating a propellant component through each of the segmental portions of said inner and outer walls, and control means for varying the amount of propellant component circulated into said segmental portions so as to regulate the expansion and contraction of said inner and outer walls and vary said throat portion cross section in accordance therewith.

2. A liquid rocket engine according to claim 1, including means for circulating a portion of each propellant component after it passes through said cooling jackets into said combustion chamber for combustion therein.

3. A liquid rocket engine comprising an outer tubular wall, an inner tubular wall spaced from said outer wall inwardly and arranged concentrically within said outer tubular wall, each of said walls having a cooling passage defined therein, said outer and inner walls defining a combustion chamber therebetween with a converging wall and nozzle throat section and a thrust discharge injection head means associated with said walls for injecting a propellant component into the combustion chamber, each of said outer and inner walls having at least one cooling conduit for the flow of a propellant component therethrough, means for directing a propellant component to the cooling conduits of said inner and outer walls selectively and control means for varying the quantity of propellant component flowing through at least one of said inner and outer walls in order to vary the amount of thermal expansion and contraction of said wall and to vary the spacing of said wall in respect to the other of said walls for varying the throats cross-section.

4. A rocket engine according to claim 3, wherein said control means comprises a globe valve, said inner wall having a plurality of separate cooling jackets around its circumference each having a connecting passage extending into said globe valve, said globe valve having a housing with a globe valve member pivotal in said housing and with a closing edge positioned to partly close each of said passages in a neutral position, and means for tilting said globe valve to at least partially close one of said passages and to open another of said passages for regulating the flow of propellant component from said globe valve through each of said passages.

5. A rocket engine comprising a housing having spaced apart annular inner and outer housing parts defining therebetween a combustion chamber with converging walls leading to a nozzle throat, at least one of said housing parts having at least a portion which is reversably deformable to vary at least one of the size of said nozzle throat and the orientation of said nozzle throat, and control means for moving said at least one of said housing parts relative to the other housing part by deforming it for varying the size and orientation of said nozzle throat.

6. A rocket engine comprising a housing having spaced apart annular inner and outer housing parts defining therebetween a combustion chamber with converging walls leading to a nozzle throat, at least one of said housing parts having at least a portion which is reversibly deformable to vary the size and orientation of said nozzle throat, and control means for moving said at least one of said housing parts relative to the other housing part by deforming it for varying the size and orientation of said nozzle throat.

7. A rocket engine according to claim 6, including means for clamping said inner and outer walls at locations spaced inwardly from said nozzle parts around said combustion chamber.

8. A rocket engine according to claim 6, wherein said control means includes a mechanical device for elastically deforming at least a portion of one of said inner and outer walls.

9. A rocket engine according to claim 6, wherein said control means comprises a thermal control device for varying the thermal expansion of at least one of said housing parts in accordance with a desired change of said nozzle throat cross section.

10. A rocket engine comprising a housing having spaced apart annular inner and outer housing parts defining therebetween a combustion chamber with converging walls leading to a nozzle throat, and control means for moving at least a portion of one housing part relative to the other housing part for varying the size and orientation of said nozzle throat, wherein each of said housing parts includes a cooling jacket defined therein for the passage of a cooling liquid therethrough, said control means comprising means for regulating the cooling liquid flowing through said housing parts so as to effect the thermal change of dimension thereof for varying the size of said nozzle throat.

11. A rocket engine according to claim 10, including means for directing separate propellant components into the cooling passage of said inner and outer housing parts.

12. A rocket engine comprising a housing having spaced apart annular inner and outer housing parts defining therebetween a combustion chamber with converging walls leading to a nozzle throat and control means for moving at least a portion of one housing part relative to the other housing part for varying the size and orientation of said nozzle throat, wherein each of said housing outer and inner walls includes respective inner and outer cooling jacket means, at least one of said inner and outer cooling jacket means being subdivided into a plurality of separate segments extending over only a portion of the circumference of the respective inner and outer walls, said control means including a control valve system for controlling the flow of cooling medium into each of said segments separately.

13. A method of operating a rocket engine having a housing with spaced apart outer and inner walls which define a combustion chamber, a converging section and a nozzle throat therebetween, comprising controlling the reversible deformation of at least one of said outer and inner walls relative to the other to vary the cross-section of a nozzle thrust in accordance with changes in the engine output.

14. A method according to claim 13, wherein the positions of said outer and inner walls are varied by thermal changes.

15. A method according to claim 13, wherein the positions of said outer and inner walls are varied mechanically by elastically deforming at least one of said outer and inner walls.

* * * * *